United States Patent [19]

Mohr

[11] Patent Number: 4,800,237

[45] Date of Patent: Jan. 24, 1989

[54] MULTI-SERVICE PRESET ACCESS UNIT FOR CELLULAR RACEWAY

[75] Inventor: Gregory L. Mohr, Mineral Wells, W. Va.

[73] Assignee: Butler Manufacturing Company, Kansas City, Mo.

[21] Appl. No.: 474,696

[22] Filed: Mar. 11, 1983

[51] Int. Cl.4 .............................................. H02G 3/18
[52] U.S. Cl. ...................................................... 174/48
[58] Field of Search ...................... 174/48, 49; 52/221

[56] References Cited

U.S. PATENT DOCUMENTS

| | | | |
|---|---|---|---|
| 3,592,956 | 7/1971 | Fork | 52/221 X |
| 4,041,238 | 8/1977 | Penczak | 174/48 |
| 4,338,484 | 7/1982 | Littrell | 52/221 X |
| 4,454,692 | 6/1984 | Ault | 52/221 |

OTHER PUBLICATIONS

Midland-Ross Corporation, Bulletin 70101.
Midland-Ross Corporation, Bulletin FB-663, Apr. 1977.

Primary Examiner—A. T. Grimley
Assistant Examiner—David A. Tone
Attorney, Agent, or Firm—Frederick J. Olsson

[57] ABSTRACT

The unit has a flat base to be postioned over the cellular raceways with appropriate openings to the communication raceways (telephone/data) and to the power raceways together with a housing on the base having a central or main section (accessible from the floor for wiring), a pair of power sections respectively disposed on opposite sides of and open to the main section and open to the power raceway and providing passageways for conductors between the main section and power raceway together with a pair of communication sections open to the communication raceways and respectively disposed in the other opposite sides of and open to the main section and providing passageways for conductors between the main section and the communication raceways. In a modified version, the power sections are eliminated and the receptacles are mounted on a support inside the main section.

12 Claims, 4 Drawing Sheets

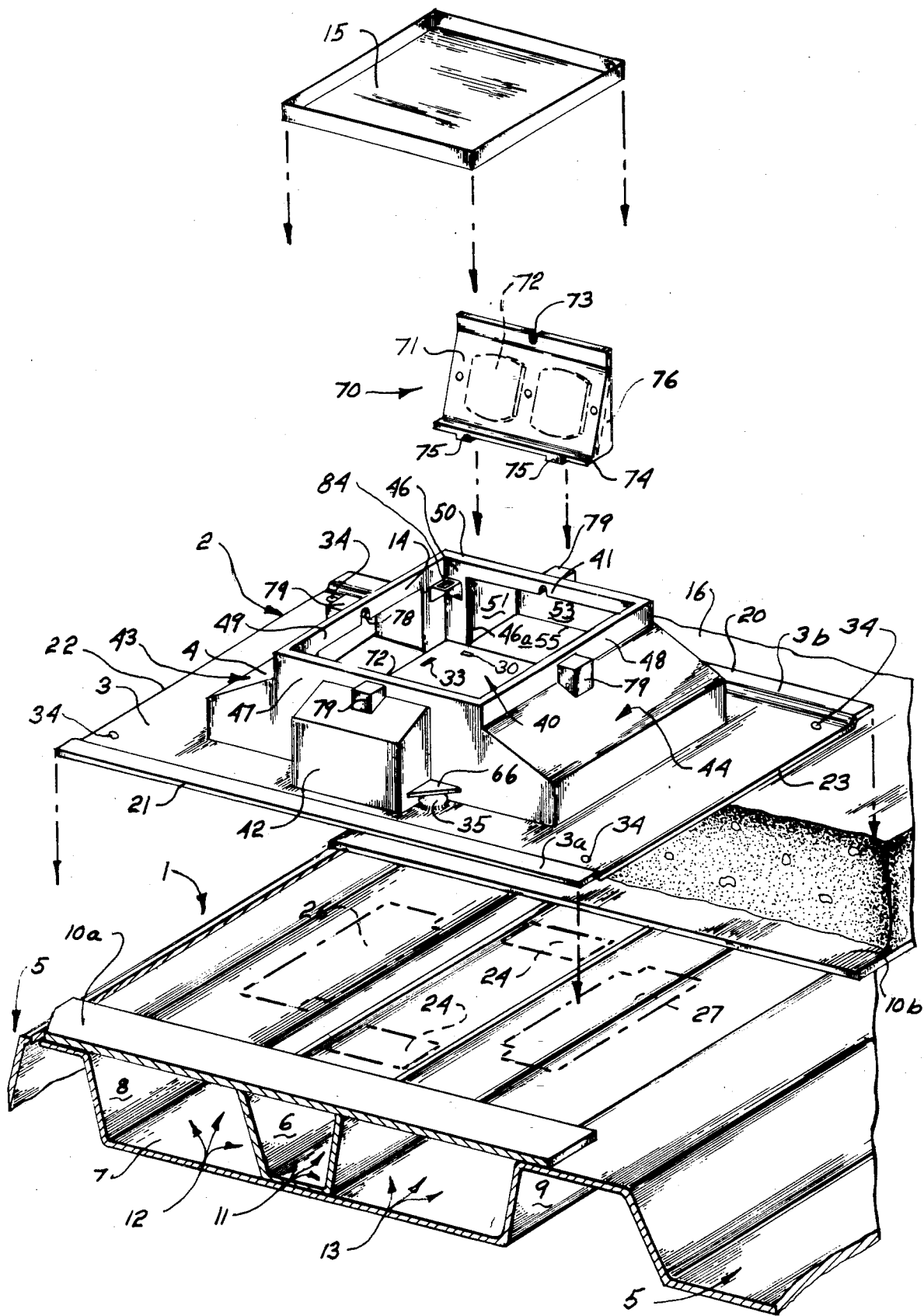

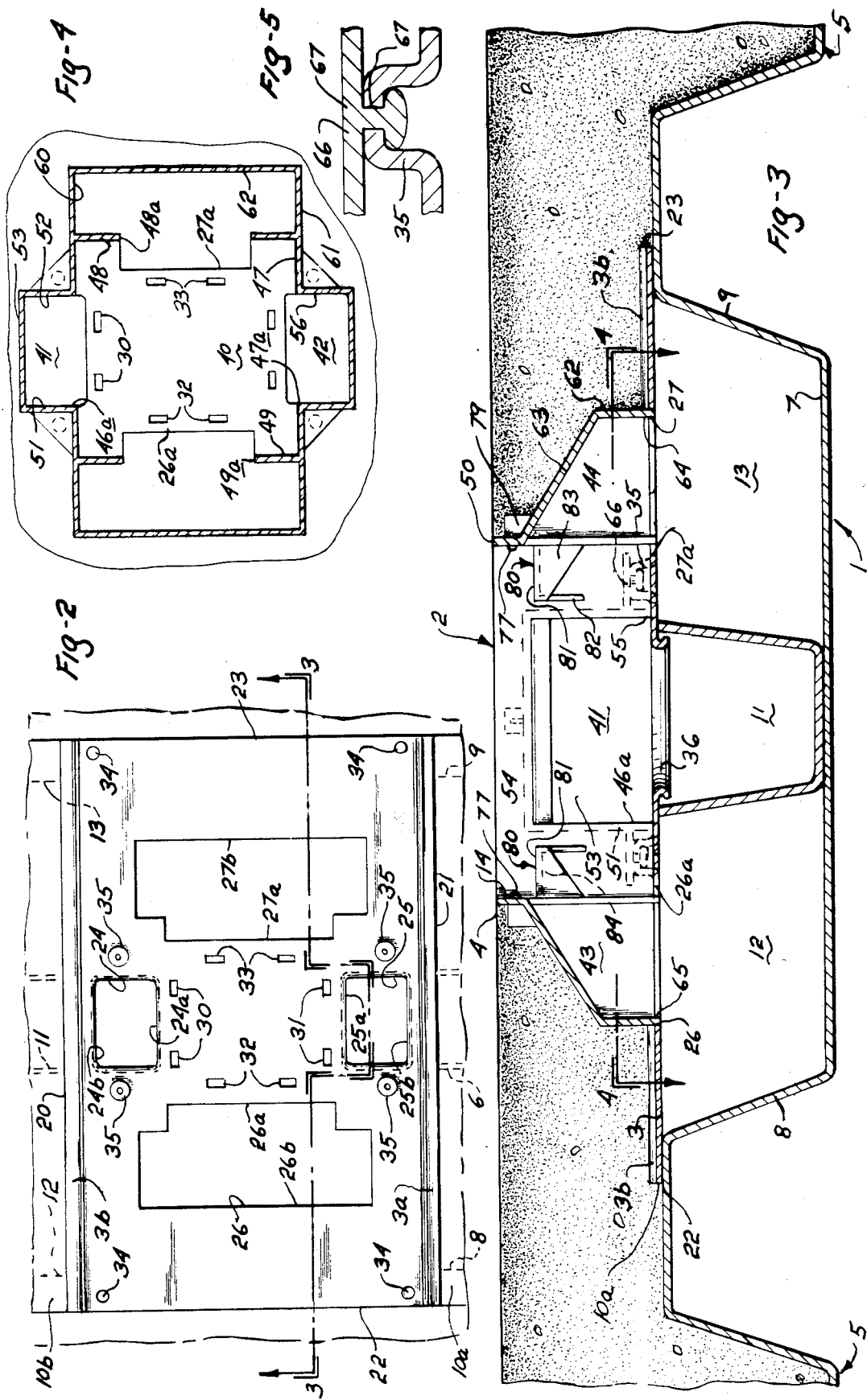

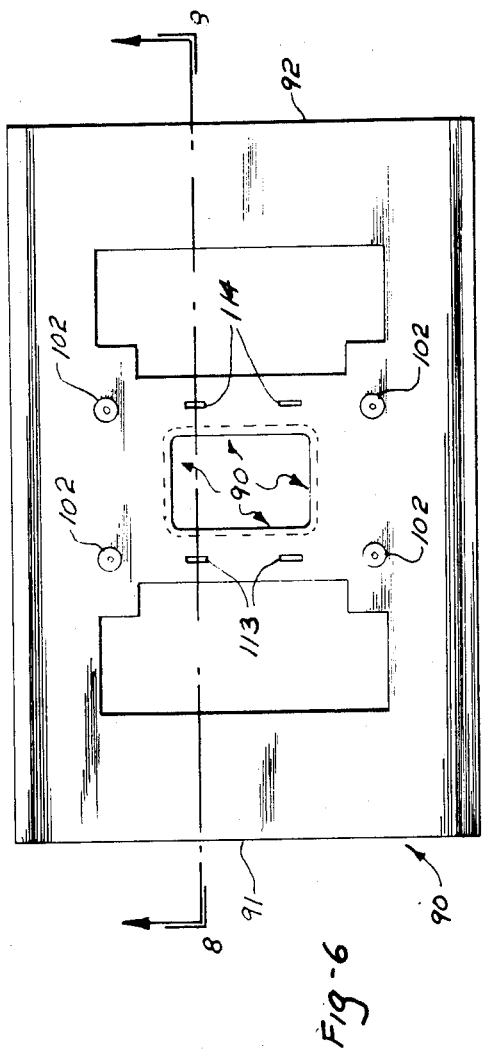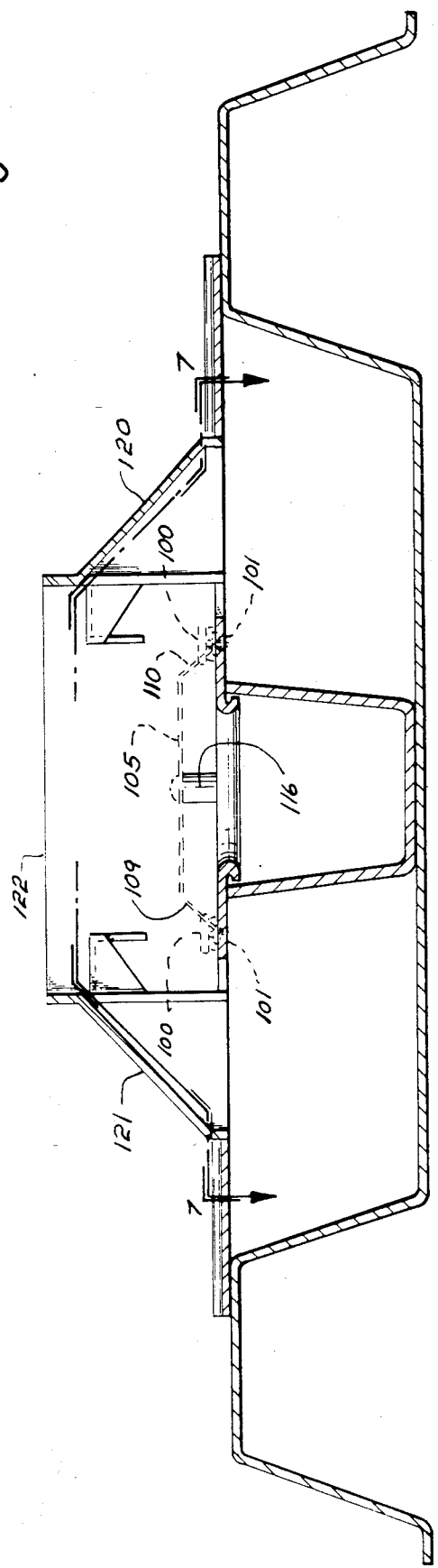

MULTI-SERVICE PRESET ACCESS UNIT FOR CELLULAR RACEWAY

The invention relates in general to electrical underfloor systems for buildings. More particularly, the invention relates to preset access units used with cellular raceways in the building floors to provide the necessary power and communication service.

The principal objective of the invention is to promote the useful art of electrical underfloor systems by means of a design providing a preset access unit which is (a) functionally superior to access units now in use; and (b) which reduces the costs of such systems for the building owner.

Functional superiority comes about by that the design provides an access unit which will minimize cracking of the concrete around the floor opening due to the imposition of heavy loads without at all sacrificing and indeed increasing accessibility by increasing the interior space useable by the electrician in the wiring of the unit.

System cost reduction comes about because the design provides for a substantial reduction in access unit cost and this reduction becomes significant because there are tens of thousands of access units employed in a building, because of the virtual elimination of maintenance due to the type of concrete cracking mentioned above, and further because the accessibility reduces the electrician's time spent on wiring at initial installation and in subsequent modification or activation.

The preferred design of the access unit will be described below in connection with the following drawings wherein:

FIG. 1 is an exploded view showing the access unit above a cellular raceway means to which it is to be secured;

FIG. 2 is a plan view of the base of the access unit of FIG. 1;

FIG. 3 is a plan sectional view taken along the lines 3—3;

FIG. 4 is an elevational sectional view of the access unit of FIG. 1 as installed in the cellular raceway means;

FIG. 5 is a fragmentary sectional view showing the means for securing the housing and base together;

FIG. 6 is a plan view of the base of a modified unit and FIGS. 7 and 8 respectively are plan and side elevational views of the housing of the modified unit.

Figure 9:
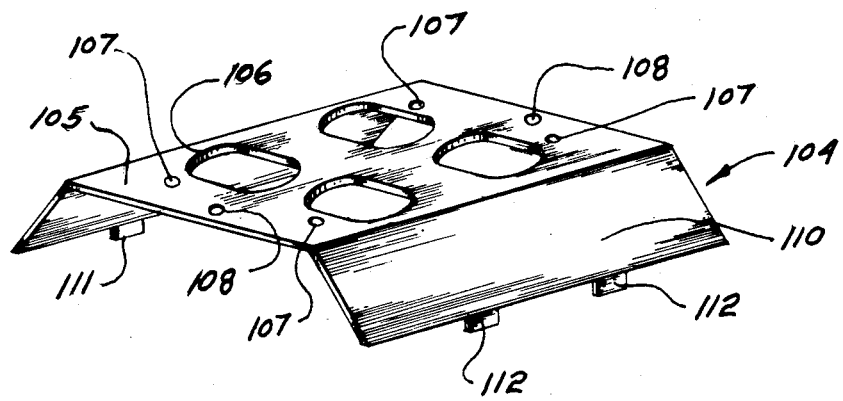
FIG. 9 is a perspective view of a receptacle bracket employed with the modified unit.

The access unit of the invention may be employed with both factory and field assembled cellular raceway means. In the discussion herein, the cellular raceway means shown is used by way of descriptive purposes only. The cross-sectional shapes of the raceway cells are representative; raceway cells of the kind in question may take a variety of shapes.

The particular cellular raceway shown herein is adapted for tri-service and has a power cell and a pair of cells on opposite sides of same used respectively for telephone and data or any combination of the latter.

Referring to the exploded view of FIG. 1, the cellular raceway means is indicated at 1 and the access unit of the invention at 2. The access unit 2 comprises the base 3 and the housing 4.

The cellular raceway means 1 disclosed herein is a type which is field assembled and formed in the corrugated decking 5 between a pair of adjacent corrugations. For such purposes a U-shaped member 6 is installed in the valley 7 between corrugations 8 and 9 with the valley being closed off by multiple covers as indicated by the covers 10a and 10b connected to the tops of the corrugations 8 and 9. The U-shaped member 6 and covers 10a, 10b, etc. divide the valley 7 into three independent and electrically isolated sections. The section inside the member 6 becomes the power raceway or cell 11 and the sections on opposite sides become the communication cells 12 and 13.

As will be observed, the covers 10a and 10b are separated to provide a space for the access unit to be positioned between the covers over the cellular raceway means. The base 3 engages and is connected to the tops of the corrugations 8 and 9 as indicated. The base has raised flanges 3a and 3b which overlie the edges of the covers 10a and 10b.

It will be understood, of course, that multiple covers and access units are used in the usual floor installation. Also, it will be understood that the tops of the corrugations 8 and 9 and the bottom of the valley 7 and the covers may be ribbed or have other strengthening or anti-shifting configurations, but the same are omitted in the showing herein.

The access unit 2 has a top opening 14 which provides access between the interior of the unit and the floor. The opening 14 is provided with a mud cap 15. When the concrete 16 is poured, both the cellular raceway and unit will be buried in the concrete.

When the access unit is activated the concrete on top of the mud cap 15 is chipped away and the mud cap removed, the necessary wiring accomplished, and an appropriate floor fitting secured to the unit. Means on the unit for supporting the floor fitting will be noted later.

The details of the base 3 of the access unit will be described.

The base is flat and rectangular in shape and has elongated, peripheral power edges 20 and 21 and peripheral communication edges 22 and 23. A power aperture 24 is formed adjacent the edge 20 and a power aperture 25 is formed adjacent the edge 21. A communications aperture 26 is formed adjacent the communication edge 22 and a communications aperture 27 is formed adjacent the communication edge 23. The power and communication apertures are respectively symetrically arranged with respect to the longitudinal and lateral center lines of the base.

As indicated in FIG. 2 (and by the phantom lines in FIG. 1), the power apertures 24 and 25 are open to the power cell 11, the communications aperture 26 is open to the communications cell 12, and the communications aperture 27 is open to the communications cell 13.

The power and communication apertures have inboard edges which are noted (FIG. 2) respectively at 24a, 25a, 26a, and 27a and also have outboard edges which are noted respectively at 24b, 25b, 26b, and 27b. Adjacent the respective inboard edges are pairs of face plate locking slots 30, 31, 32 and 33. The spacing between each pair of slots is identical.

Just inboard of the raised flanges 3a and 3b and adjacent the communication peripheral edges are holes 34 which are for use in securing the base to the top of the deck corrugations 8 and 9. This is normally accomplished by the use of blunt-head, self-tapping screws. One or more holes in addition to the holes 34 may be employed for adapting the base for cellular raceways formed between corrugations of different spacing.

Interposed between adjacent pairs of power and communication apertures are dimples 35 which are used in securing the base and housing together as will be noted later. The peripheral edges of the power apertures 24 and 25 are turned under as noted at 36 in FIG. 4 to provide a smooth surface for pulling power cables.

The structure of the housing unit 2 will next be described.

The housing has a square-shaped main section 40, a pair of power sections 41 and 42, and a pair of communication sections 43 and 44. Each of these sections is connected to the base 3 in the sense of being in a close, abutting relationship.

The main section 40 is formed as by a square side wall including (FIGS. 1 and 3) a pair of power wall means 46 and 47 adjacent the respective power aperture inboard edges 24a and 25a. The square side wall further has a pair of communication wall means 48 and 49 adjacent the respective communication aperture inboard edges 27a and 26a.

The housing walls 46, 47, 48, and 49 extend vertically and while being dimensioned to form a square (in plan), it will be understood that a rectangular shape may be employed.

The top portions of the walls 46, 47, 48, and 49 form the opening 14. The edges of the walls 46-49 are co-planar and form the top edge 50.

The power walls 46 and 47 respectively have power openings 46a and 47a and the communication walls 48 and 49 have communication openings 48a and 49a. Each opening extends from the base up to a point below the top edge 50.

The inboard edges 24a and 25a of the power apertures 24 and 25 are located inboard of the power walls 46 and 47 and the inboard edges 26a and 27a of the communication apertures are located inboard of the communications walls 49 and 48. The foregoing is noted in FIG. 4 for the edges 26a and 27a. The arrangement in effect enlarges the power openings 46a and 47a and the communications openings 49a and 48a. This provides additional space for access to the cells without compromising electrical isolation.

In summary, it will be seen that the main section is formed as a hollow, vertically extending structure with its top open as at 14. The open space characteristic extends all the way down to the base. The demensions of the main section are approximately 5½"×5½" and a height of 2⅜" which provides easy access and ample space for wiring purposes.

The power sections 41 and 42 are disposed in positions opposite one another and extend outwardly of the main section 40. Note that the respective lateral dimension of each power section is shorter than that of the main section. The communication sections 43 and 44 likewise extend out from the main section and have the same lateral dimension as the main section, although a shorter dimension is contamplated as noted later.

The power sections 41 and 42 are identical in construction and the details of the structure of same will be done in connection with power section 41. The communication sections 43 and 44 are also identical and an explanation will be in connection with section 44.

The power section 41 has a pair of side walls 51 and 52 connected to the power wall 46 (at power opening 46a) and extending outwardly of same, a rear wall 53 connected with the outer ends of the side walls 51 and 52 together with a top wall 54 which is joined to the power wall 46, to the side walls 51 and 52, and to rear wall 53.

The top, rear, and side walls form the power section 41 into a hollow configuration with the side walls and rear wall forming a bottom opening 55 which is in alignment with the base power aperture 24. Likewise, the power section 42 is hollow and has a bottom opening 56 aligned with base power aperture 25.

The communication section 44 has a pair of side walls 60 and 61 connected to the communication wall 48 (at opening 48a) and extending outwardly of same, a rear wall 62 connected with the outer ends of the side walls 60 and 61 together with a top wall 63 which is joined to the communication wall 48, to the side walls 60 and 61, and to rear wall 62.

The top, rear, and side walls of the communication section 44 form the hollow configuration referred to above and the rear and side walls form a bottom opening 64 which is in alignment with the communication aperture 27. Likewise, the communication section 43 is hollow and has a bottom opening 65 aligned with communication aperture 26.

Thus, it will be observed that the passageways between the hollow main section 40 and the communication cells 12 and 13 and the power cell 11 is established as follows.

The main section 40 is in communication with the power cell 11 via the power opening 46a, the hollow interior of power section 41, bottom opening 55, and power aperture 24 in the base. The main section 40 is also in communication with the power cell 11 via the power opening 47a, hollow interior of power section 42, bottom opening 56, and power aperture 25 in the base.

The main section 40 is in communication with communication cell 13 via the communication opening 48a, the hollow interior of communication section 44, the bottom opening 64, and the communication aperture 27. The main section 40 is also in communication with communications cell 12 via communication opening 49a, the hollow interior of communication section 43, the bottom opening 65, and the communications aperture 26 in the base.

Note that the top walls of the power and communication sections are each connected to the main section at points below the top edge 50 and slant downwardly toward the base.

The housing 40 is fixedly secured to the base 3 by a rivet type arrangement. Adjacent the side walls of each power section are located platforms 66 (FIG. 3) each of which are joined to a side wall and a power wall. Each platform 66 is formed with a rivet 67 (FIG. 5). When the housing is positioned over the base for attachment, the rivets 67 are lined up with the holes in the dimples 35 in the base and extend down through the apertures to the underside of the dimples. As best noted in FIG. 5, the end of each rivet 67 is upset and the head material is firmly pushed into the underside of the dimple.

Normally both of the two power sections carry a receptacle. The receptacles are mounted on face plates which cover the power openings as explained below.

With reference to FIG. 1, the face plate 70 has a slanted receptacle support 71 with conventional knockouts 72 and screw slot 73, a foot 74 carrying a pair of tangs 75 extending forwardly of the support 71, and side flanges 76 extending rearwardly of the support 71.

The plate is mounted on the base by that the tangs 75 fit into a pair of locking slots 30 and the head of a self-tapping screw 77 bears on the support 71. The screw extends through the slot 73, the aperture 78 in the main section 40, and is threaded in the enlarged section 79.

Where no receptacle is to be used in a power section, the plate 70 is mounted without the knockouts being removed. When a receptacle is employed, the knockouts are removed, the receptacle wired and secured on the support 71, and the plate/receptacle assembly mounted as mentioned above.

Normally the communication openings 48a and 49a remain uncovered. Amphenol connectors may be stored in one or both of the communication sections 43 and 44. However, where it is necessary to isolate one or both of the communication sections 43 and 44, the communications opening is covered with a face plate like plate 70 with the knockouts intact.

The face plate is secured over a communications opening in the same manner as previously described; i.e. tangs 75 in locking slots 30 and a screw head bearing on the support 71.

For purposes of mounting an activating unit, I have provided support brackets 80 each at the intersection of a power and communication wall. Each bracket comprises a top 81 and triangular-shaped support arms 82 and 83. Each top 81 has a square hole 84 to receive a self-locking Tinnerman nut. Each nut receives a leveling screw for supporting an adjusting ring.

I will now comment on the modified unit as shown in FIGS. 6 through 9.

The objective of the design of FIGS. 6 through 9 is to use less material and simplify the mold for die casting the housing. To this end, the power sections are eliminated and the communication sections have full slanted tops.

FIG. 6 is a plan view of the base 90 of the modified unit. The base has the same structure as the base 3 except as noted below.

It will be observed that the power apertures 24 and 25 have been replaced by a single, central aperture 90. With the elimination of the power sections, base material can be eliminated. Thus, the peripheral communication edges 91 and 92 are shorter than the corresponding edges 22 and 23.

Figure 7:
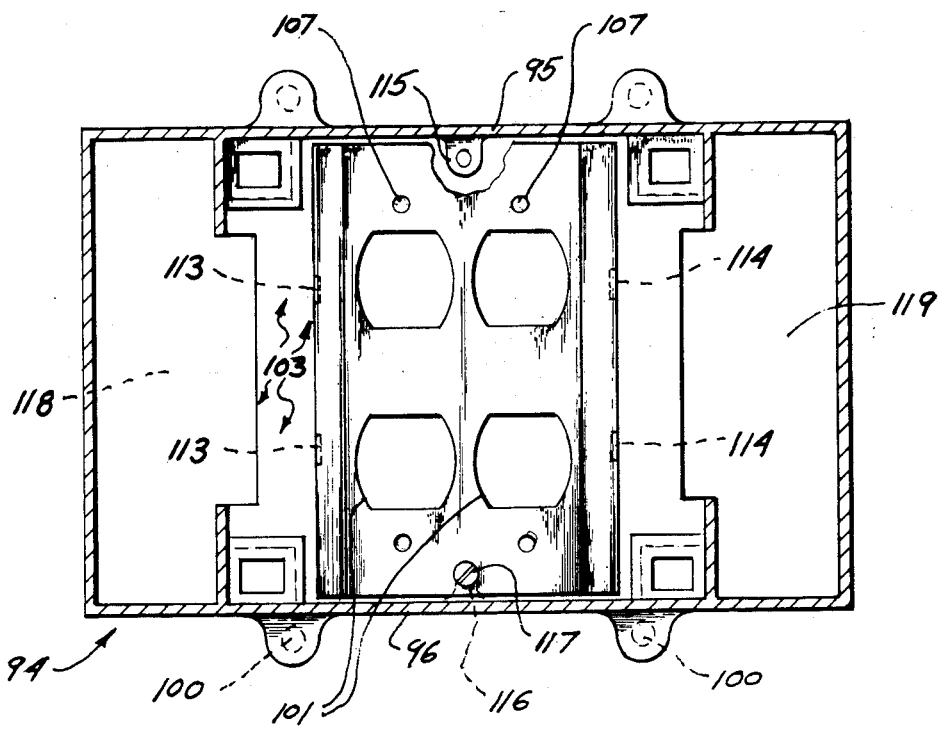

The housing 94 of the modified unit has the same structure as housing 2 except as noted in FIGS. 7 and 8 which are respectively plan and elevational views of the modified housing.

With the elimination of the power sections, the power walls 95 and 96 are solid or without power openings as walls 46 and 47. The locking slots 30 in front of the power opening are also eliminated. Additionally, the platform and rivet arrangement 66 and 67 of FIGS. 1-5 has been somewhat changed in that the platforms 100 project out from the power walls 95 and 96. The rivets 101 cooperate with the dimples 102 on the base for securing the housing 94 and base 90 together.

In the modified version the receptacles are mounted inside of the main section 103 as described below.

FIG. 9 is a perspective view of a bracket 104 which is to be mounted inside the main section and support a pair of receptacles.

The bracket has a flat top 105 with receptacle knockouts 106, receptacle mounting holes 107, and bracket mounting holes 108.

Sides 109 and 110 slant down from the top 105 and respectively have tangs 111 and 112.

As indicated in FIGS. 7 and 8, the bracket 104 is adapted to be placed down on the base 90 with the tangs 111 in locking slots 113 and tangs 112 in locking slots 114. Apertured bosses 115 and 116 are provided on power walls 95 and 96 and when the bracket is down firm against the base, the underside of the top 105 engages the tops of the bosses and the holes 108 are aligned with the apertures in the bosses. The bracket is held down by self-tapping screws such as screw 117. The bracket 105 extends fully across the main section 103 and electrically isolates the receptacles and the communication sections 118 and 119.

With reference to FIG. 8, it will be seen that the top 105 and slanted sides 109 and 110 are positioned to provide ample clearance for an amphenol connector to be moved in and out of the communication sections 118 and 119.

It will be understood that where the preset unit is to service communication cells only the bracket 104 is placed in position with the knockouts 106 intact. Otherwise, the knockouts are removed, the receptacles mounted in place, wired, and the assembly mounted and secured to the base as described.

With respect to the communication sections 118 and 119, it will be observed (FIG. 8) that the rear walls and top walls have been combined in that the tops 120 and 121 each have a continuous slant from near the top of the main section 103 to the base 90.

Having described the structures of the access units, I will now further discuss how the structures contribute to attaining the objectives of the invention.

With respect to minimizing cracking of the concrete around the floor opening note the following.

The overall heights of typical units are 2⅜ and 3⅛. Thus the top edges 50 and 122 of the main section 40 and 103 will be in the range of ⅞" to 1¼" below the surface of the concrete depending on floor location. The connection between the top walls of the power sections and the communication sections of FIGS. 1-5 is approximately ½" below the top edge. Thus, there is at least a ⅜" thickness of concrete surrounding the floor opening. In the unit of FIGS. 6-9, the ⅞" thickness remains over the communication sections and with full depth along the power walls 95 and 96.

By virtue of the fact that the power sections and communication sections (FIGS. 1-5) extend away from the main section and because of the slanted top walls, the concrete gets progressively thicker out from the main section and consequently adds support to the concrete immediately around the floor opening. Moreover, at each corner of the main sections, the concrete extends the full depth of at least 2⅛" which provides additional strength. With the modification of FIGS. 6-9, the advantage of thicker concrete is enhanced.

The design of the power and communication sections, while minimizing cracking as noted above, provides more than ample space for wiring and placement of the receptacles and amphenols.

In wiring the receptcles for the unit of FIGS. 1-5 the same can be conveniently done in the main section and then the face plate/receptacle assembly and the power conductors pushed back until the face plate is in position to be secured. With respect to the modification of FIGS. 6-9, the convenient space characteristics have been previously commented on.

The communication sections of FIGS. 1-5 are designed so that the interior space of each is about 12 cubic inches which is very adequate for storing amphenol connectors. The interior space on the communication section of the modification of FIGS. 6–9 is somewhat reduced but nevertheless very adequate.

Thus, the access units provide ample room for quick wiring while at the same time provide for the concrete to have a thickness to avoid cracking.

Cost reduction comes about in several ways.

Each of the units described is manufactured in two parts. The housing is die cast and the base stamped from steel. As will be apparent to those skilled in the art, the contours of the housing of FIGS. 1–5 are arranged to allow a relatively simple die casting mold and there are no heavy sections which could interfere with the die cast process. The die casting mold for the modification of FIGS. 6–9 is further simplified.

Die casting, of course, eliminates hand assembly of the housing. Unit cost, therefore, is largely a function of material. Die amortization affects the cost but is small because of the large number of access units involved.

Further savings in material cost arises out of the design of the housing. In the unit of FIGS. 1–5, the slanted tops of the power and communication sections and the reduced lateral width of the power sections save material. By making the base separately from the housing and stamped from steel, the material cost is further reduced. Additional material is saved in the unit of FIGS. 6–9 as noted previously.

Further, saving in material can be achieved by making the lateral width of the communication sections 43 and 44 shorter than the main section 40.

Before closing, it is pointed out that either access unit may also be employed on factory assembled cellular raceways. For example, the type having three adjoining cells or the type having three spaced-apart cells. In each case, the top of each cell has an opening to which the power and communication apertures of an access unit are aligned. In the spaced-apart type, the valley sections under the access unit are closed off to prevent entry of concrete during the pour either by independent barriers or by having downward extensions on the housing. In the adjoining type, where the power cell is reduced in height, the housing is provided with a downward extension to prevent entry of concrete during the pour. With respect to securing the above units to the cells, spot welding is preferred.

I claim:

1. A preset access unit for a floor having cellular raceway means with crests thereof being co-planar, the cellular raceway means being buried in concrete, the unit including a base extending generally horizontally and a housing extending upwardly therefrom, the base adapted to position the unit over the cellular raceway means with the housing buried in the concrete:

said base being flat and formed as a unitary stamped steel piece;

said housing being formed as a unitary die cast piece and including:

(a) a main section having a side wall connected to the base and extending upwardly and providing a hollow interior structure, the side wall terminating in a top portion forming an access opening providing access to the interior of the main section, said side wall being comprised of a pair of power walls and a pair of communication walls respectively arranged whereby the main section, in plan, is in the form of a rectangle;

(b) a pair of hollow power sections respectively connected to said pair of power walls and to said base and each having a power opening open to said interior, the power sections being disposed in positions generally opposite one another and extending outwardly from the main section with the respective power openings facing one another and each power section being dimensioned to receive a power receptacle to extend across its power opening for access from the main section;

(c) a pair of hollow communication sections respectively connected to said base and to said pair of communication walls and each having a communications opening open to said interior, the communication sections being disposed in positions generally opposite one another and between said power sections and extending outwardly from the main section with the respective communications openings facing one another and each communication section being dimensioned to store a telephone amphenol connector; and (d) each of said hollow power sections and each of said hollow communication sections having a top wall which is angularly oriented to extend in a direction downwardly from the main section toward the base and the point of connection between the top wall and the side wall being substantially below the top edge of the side wall;

a pair of power apertures formed in said base respectively open to said hollow power section, portions of said power apertures respectively extending inboard of said power walls;

a pair of communication apertures formed in said base respectively open to said hollow communication sections, portions of said communication apertures respectively extending inboard of said communication walls; and said power and communication openings, said hollow power and communication sections, and said power and communication apertures formed in said base providing passageways to the cellular raceway means over which the unit is positioned.

2. The preset access unit of claim 1 wherein:

each said hollow power section has a lateral dimension shorter than the lateral dimension of the power wall to which it is attached and each said hollow communication section has a lateral dimension the same as the lateral dimension of the communication wall to which it is attached.

3. The preset access unit of claim 1 further including:

a plurality of pairs of face plate locking slots formed in said base, there being a pair closely adjacent each power and communication opening;

face plate means extending across one of said power or communication openings, the face plate having a receptacle support, a bottom foot extending forwardly and outwardly of the support, and a pair of blocking flanges on opposite sides of the support and extending rearwardly thereof;

a pair of tangs on said foot and extending into the face plate slots in said base; and a face plate locking screw, the head of which engages the face plate and the threads of which are engaged with said main section.

4. The preset access unit of claim 1 further including, at each corner of said main section side wall, support brackets for mounting an activating unit, each bracket comprising a flat top and triangular shaped support arms for the top with each arm being connected between the underside of the top and the side wall and the top having a square hole to receive a threaded nut.

5. A preset access unit for a floor having cellular raceway means buried in concrete, the unit including a base extending generally horizontally and a housing extending vertically, upwardly therefrom, the base adapted to position the unit over the cellular raceway means with the housing buried in the concrete.

the base comprising a generally flat, rectangular shaped member formed with:
 a pair of peripheral power edges and a pair of peripheral communication edges extending therebetween;
 a pair of power apertures respectively adjacent said power edges, each power aperture having an outboard edge adjacent a peripheral power edge and an inboard edge spaced inwardly therefrom;
 a pair of communication apertures respectively disposed on opposite sides of and spaced from said power apertures, each communication aperture having an outboard edge adjacent a peripheral communication edge and an inboard edge spaced inwardly therefrom;
 a plurality of pairs of face plate locking slots, there being a pair adjacent the inboard edge of each power aperture and a pair adjacent the inboard edge of each communication aperture;
the housing comprising a main section, a pair of power sections, and a pair of communication sections:
the main section comprising:
 a pair of spaced apart power wall means each connected to said base respectively adjacent the inboard edge of a power aperture and extending upwardly from the base, each power wall means having a power opening in communication with a base power aperture;
 a pair of spaced apart communication wall means each connected to said base respectively adjacent the inboard edge of a communication aperture and extending upwardly from the base, the communication wall means connected respectively to said power wall means and extending therebetween and each communication wall means having a communication opening in communication with a base communication aperture;
 an access opening formed by the top portions of the power and communication wall means, the opening being for use in providing access to the interior of the main section;
 said power wall means and said communications wall means respectively providing a hollow interior structure;
each power section having a rear wall, a pair of side walls, and a top wall and in each power section:
 the rear wall being spaced outwardly from a power wall and the pair of side walls being respectively connected between the rear wall and power wall;
 the top wall being connected to said rear and side walls and also connected to said power wall, last said connection being above the power opening in the power wall and below said access opening so that a substantial amount of the power wall above the top wall remains exposed, the rear and side walls being dimensioned whereby the top wall is angularly oriented to extend in a direction from the top of the power opening downwardly and outwardly toward the base;
 the rear, side, and top walls respectively providing a hollow interior structure extending outwardly of said main section and the interior being in communication with a power aperture and a power opening;
each communication section having a rear wall, a pair of side walls, and a top wall and in each communication section:
 each last said rear wall being spaced outwardly from a communications wall and the pair of last said side walls being respectively connected between the rear wall and communications wall;
 last said top wall being connected to the last said rear and side walls and also connected to last said communications wall, last said connection being above the communication opening in the communications wall and below said access opening so that a substantial amount of the communications wall above the top wall remains exposed and last said rear and side walls being dimensioned whereby the top wall is angularly oriented to extend in a direction from the top of the communication opening downwardly and outwardly toward the base; and
 last said rear, side, and top walls respectively providing a hollow interior structure extending outwardly of said main section and the interior being in communication with a communication aperture and a communication opening.

6. The preset access unit of claim 5 further including:
 adjacent the top of each power wall and each communication wall, a face plate locking aperture to receive a face plate locking screw;
 face plate means extending across one of said power or communication openings, the face plate having a receptacle support, a bottom foot extending forwardly and outwardly of the support, and a pair of blocking flanges on opposite sides of the support and extending rearwardly thereof;
 a pair of tangs on said foot and extending into the face plate slots in said base; and
 a face plate locking screw, the head of which engages said face plate and the threads of which are engaged with one of said locking apertures.

7. The access unit of claim 5 further including:
 two pair of apertured dimples extending upwardly from said base; and
 two pair of studs on said housing and respectively extending through the aperture in a dimple with the outer end upset and firmly engaging the underside of the dimple whereby to secure the base and housing together.

8. A preset access unit for a floor having cellular raceway means buried in concrete, the unit including a base extending generally horizontally and a housing extending upwardly therefrom, the base adapted to position the unit over the cellular raceway means with the housing buried in the concrete:
 a base;
 a main section having a side wall connected to the base and extending upwardly and providing a hollow interior structure, the side wall terminating in a top portion forming an opening providing access to the interior of the main section;
 a pair of hollow communication sections connected to said base and to said side wall and being disposed in positions generally opposite one another and extending outwardly from the main section;

each of said hollow communication sections having a top wall which is angularly oriented to extend in a direction downwardly from the main section to the base and the point of connection between the top wall and the side wall being substantially below the top edge of the side wall;

communication opening means formed in said base and in said side wall to provide passageways respectively from said main section through said opening means in the side wall, through said hollow communication sections, and through said opening mean in said base to the cellular raceway means over which the unit is positioned;

power opening means formed in said base within the confines of said main section; and a receptacle bracket mounted on said base within the confines of said main section and extending over said power opening means and electrically isolating said power opening means from said communication opening means.

9. The preset access unit of claim 8 wherein said receptacle bracket is formed with a top for supporting receptacle means and has a pair of sides respectively slanting down from opposite edges of the top and engaging said base, said top and side walls extending fully across said main section.

10. The preset access unit of claim 8 further including:

two pair of locking slots formed in said base respectively adjacent a communication opening;

a pair of tangs respectively formed on the bottom edge of said slanted sides and being disposed in a pair of locking slots;

a pair of aperture bosses formed on said main section and engaged by the underside of said top; and screw means threaded in said bosses and securing said top to said bosses.

11. The preset access unit of claim 8 further including means on said main section side wall for mounting an activating unit.

12. In a concrete floor the combination of a preset access unit and cellular raceway means both buried in concrete, the cellular raceway means including a power cell and a pair of communication cells respectively on opposite sides of the power cell with the power cell having power opening means formed in the top thereof and said preset access unit including an upwardly extending housing positioned over the cellular raceway means, and said housing comprising:

a main section having a side wall extending upwardly and providing a hollow interior structure above said power opening means, the side wall terminating in a top portion forming an opening providing access to the hollow interior, said side wall, in plan, being in the form of a rectangle and having a pair of communication walls facing one another and each communication wall having communications opening means open to said interior;

a pair of hollow communication sections respectively connected to said pair of communication walls in alignment with the communications opening means therein, the communication sections each extending substantially outwardly from the main section with each being dimensioned to store a telephone amphenol connector;

each of said hollow communication sections having a top wall which is angularly oriented to extend in a direction downwardly from the communication wall and the point of connection between the top wall and the communication wall being substantially below the top edge of the communication wall; and a receptacle bracket mounted within the confines of said main section and extending over said power opening means and electrically isolating said power opening means from said communication opening means.

* * * * *